Dec. 28, 1948.    J. G. LAWRENCE    2,457,246
BREAKING LEAD HALTER FOR CATTLE
Filed July 18, 1946
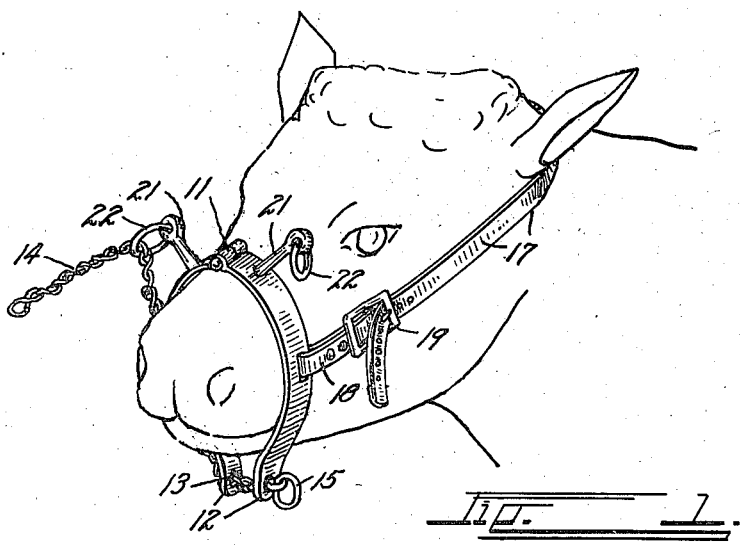
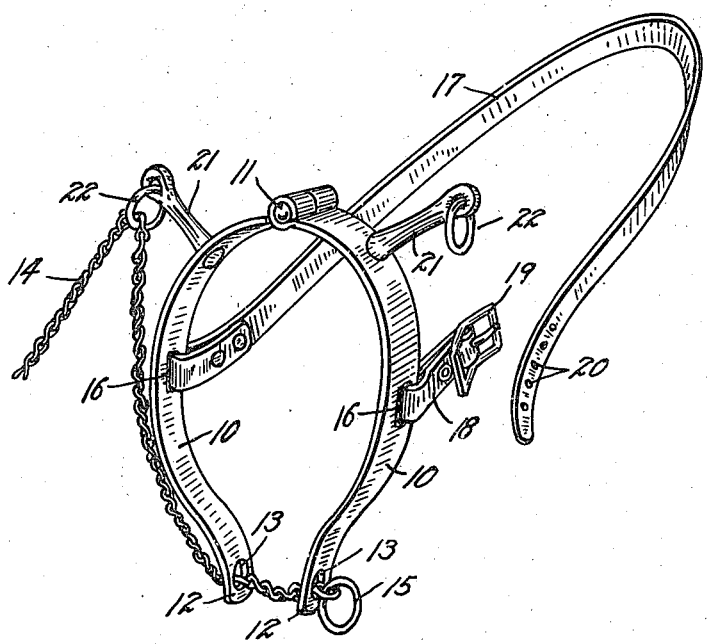
INVENTOR.
JOHN G. LAWRENCE
BY
ATTORNEY Patented Dec. 28, 1948

2,457,246

UNITED STATES PATENT OFFICE 2,457,246

BREAKING LEAD HALTER FOR CATTLE

John G. Lawrence, Des Moines, Iowa

Application July 18, 1946, Serial No. 684,503

2 Claims. (Cl. 54—24)

This invention relates to a breaking lead halter for cattle, and has for its principal object the provision of a simple and highly efficient device which can be placed over the muzzle of a calf to train him to follow a lead; which will exert a clamping action on the jaw when the animal pulls back on the leash; and which will act to bend the head of the animal downwardly when he resists leading so as to quickly train him to follow and not resist the pulling of the leash.

Another object of the invention is to so construct the device so that it may be quickly and easily placed upon the muzzle of a recalcitrant animal to lead from either side and to provide a device of this character which will not injure the animal.

Other objects and advantages reside in the detail construction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawing and throughout the description.

In the drawing:

Fig. 1 illustrates the improved lead halter as it would appear in use; and

Fig. 2 is a perspective view of the halter.

The improved lead halter comprises two rigid, arcuate side members 10 hinged together at their tops by any suitable hinge pin 11 so that they may swing freely toward and away from each other and so that they form a complete loop-like yoke. The bands terminate at their bottoms in downwardly turned extremities provided with openings 13 through which a flexible member, such as a lead chain 14, is passed. The lead chain 14 terminates in a terminal ring 15 which prevents the chain from pulling completely through the openings 13.

The members 10 are slotted, as shown at 16, for receiving a head strap 17 and a buckle strap 18. The buckle strap 18 carries a conventional strap buckle 19, and the extremity of the head strap 18 is perforated, as shown at 20, for connection to the buckle 19.

Each of the members 10 is provided with a horn-like projecting post 21 rigidly affixed thereto and projecting upwardly and outwardly therefrom. The posts 21 carry loosely-swinging rings 22.

In use, the members 10 are slipped over the muzzle of the animal, as shown in Fig. 1, and the head strap 17 is passed around the back of the head of the animal behind the ears to support the members 10 thereon. The chain 14 is then passed through the openings 13 and through one of the rings 22.

When the chain is drawn upon, it acts to clamp the members 10 around and against the muzzle of the animal. The chain also pulls on the post 21 to which it is connected. The post 21 acts as a lever to tend to swing the upper portion of the entire yoke, formed by the members 10 forwardly and downwardly to cause the lower portion to pry against the lower jaw of the animal, twisting the head downward and to one side. The resulting discomfort soon teaches the animal to follow the lead of the chain.

Two of the posts 21 are provided, although only one is used at a time. By having one of the posts on each side, however, the chain 14 can be extended in either desired direction through the holes 13 and through either of the rings 22 so that the animal may be led from either side as is most convenient.

While a specific form of the improvement has been described and illustrated herein, it is desired to be understood that the same may be varied, within the scope of the appended claims without departing from the spirit of the invention.

Having thus described the invention, what is claimed and desired secured by Letters Patent is:

1. A lead halter for cattle comprising: a muzzle yoke adapted to surround the muzzle of an animal; a head strap connected to said yoke and adapted to extend over the head of the animal to support the yoke thereon; a post projecting outwardly and upwardly from the yoke; and means for connecting a flexible member to said post.

2. A lead halter for cattle comprising: two, arcuate, side yoke members; means hinging said members together at their upper extremities to form a loop-like muzzle yoke for the animal; downwardly turned lower extremities on said members, said extremities being perforated; a head strap secured to said members and adapted to extend over the head of the animal; a post fixed to and extending upwardly and outwardly from one of said members; a receiving ring carried on the extremity of said post; and a flexible member extending through said perforations and upwardly through said receiving ring to form a leash for the animal.

JOHN G. LAWRENCE.

REFERENCES CITED

The following references are of record in the file of this patent:

UNITED STATES PATENTS

| Number | Name | Date |
|---|---|---|
| 2,422,308 | Masbruch | June 17, 1947 |